Patented July 7, 1936

2,047,022

UNITED STATES PATENT OFFICE 2,047,022

METHOD FOR OBTAINING COLOR SEPARATION

Joseph S. Friedman, Newark, N. J., assignor to Omnichrome Corporation, New York, N. Y., a corporation of New York No Drawing. Application May 9, 1935,
Serial No. 20,609

5 Claims. (Cl. 95—2)

This invention relates to improvements in methods for obtaining color separation as applied to color photography and the graphic arts.

It is an object of this invention to provide a method for obtaining multi-color separation through the use of sensitized emulsions exposed in an ordinary camera and under substantially normal light requirements; the images in the respective separation plates being in absolute registry, and the separations being obtainable at a speed of operation considerably lower than present practice.

Broadly, it is an object of this invention to provide multi-color separation for use in color photography and the graphic arts through the medium of exposure of color sensitized emulsions in monopack or bipack form, the same, after exposure, being developed and then subjected to a stopbath, after which, the respective image impressions, whether two or three colored, are printed separately in a reflection printer upon separate plates, one for each color impression.

Still further, it is an object of this invention, in conjunction with the separate color plates representing the respective color value impressions, to apply a black and white key plate through fixing out the plate carrying the red-blue color values or images, this key plate being printed by transmitted light.

These and other advantages, capabilities and features of the invention will appear from the subjoined detailed description of specific embodiments thereof.

To obtain, for example, a three color separation with a black and white key plate; a normal blue sensitive emulsion disposed on a carrier is sensitized in a solution containing a yellow filter dye and a colloidal red sensitizer such as pinacyanol. A suitable sensitizing solution is

| | |
|---|---|
| Rapid filter yellow grams | 10 |
| Water cc | 600 |
| Pinacyanol solution (1:1000 in alcohol) cc | 15 |
| Alcohol cc | 385 |

The time of such sensitizing is approximately two minutes, and it may be desirable, prior to sensitizing, to apply a prewetting agent to the emulsion, as, for example, a solution in the nature of sodium tetra-borate, in conjunction with sensitizing dyes of a nature as to present basic characteristics; or an acid salt of a polybasic acid, such as sodium acid phthalate, in conjunction with sensitizing dyes of a nature as to present acid characteristics.

It is to be understood that the sensitizing solution hereinbefore mentioned, insofar as it relates to the red sensitizer pinacyanol, penetrates only to a portion of the depth of the emulsion, the filter dye, however, penetrating substantially through the emulsion, with the result that the emulsion becomes essentially stratified to a two-layer formation; the layer of the emulsion adjacent the carrier, as, for example, a glass plate, has been unaffected by the red sensitizing reagent, and by its nature, is essentially blue sensitive, that is, sensitive for the recordation of the blue or colder color aspects, this being the property of normal color blind emulsions, therefore, providing for a stratified emulsion capable of recording the blue and red impressions respectively, the filter yellow dye serving to prevent passage of the blue or colder color light into the red sensitive stratum upon exposure.

For production of the green image, there is applied an orthochromatic carrier, as, for example, a plate, which essentially comprises an emulsion sensitized to record green and blue-green color aspects or values upon exposure.

In the event that the carrier is, for example, of the glass plate having an emulsion on one face thereof, the aforesaid plates are loaded in the plate holder with the exposure being made through the glass side of the red-blue plate, the emulsion side of the orthochromatic plate being adjacent to and contacted with the face of the emulsion contiguous with the red stratum side of the red-blue plate in the manner of bipack practice.

After exposure and development, the two plates, the red-blue on the one hand, and the green on the other, are washed and then bathed in a stopbath involving ten percent acetic acid containing one percent chrome alum, in a manner specified in the previous application filed December 1, 1934 by Friedman, Serial No. 755,583, after which the plates are dried.

There are now presented two plates, the first of which, the red-blue plate containing the red impression on the stratum of the emulsion away from the glass, and the blue impression on the stratum of the emulsion adjacent the glass. The green plate contains the green impression on the emulsion thereof.

To obtain color separations from the two plates, the plates are placed in a reflection printer, the green image being printed by reflection onto one plate, and with respect to the red-blue plate, each image in the respective stratum, that is, the red image and the blue image, are printed separately, by reflection onto separate plates, the red-blue plate being reversed to carry out the respective steps, the unremoved silver salts in the red-blue plate serving to prevent any light reflected upon either of the stratum surfaces from penetrating beyond the surface layer of such stratum.

The plate containing the red-blue images is then fixed out in the ordinary manner and after washing and drying is printed to form the ordinary black and white key plate through the medium of transmitted light.

The respective plates, four in number, incorporating the separations for the red, green and blue, as color separations, and the black and white as a separate separation, are then treated in a manner well known in the graphic arts to produce impressions on printing plates, each for the respective color.

To obtain, for example, a two color separation, with a black and white key plate, there may be applied an orthochromatic plate which is sensitized for two color analysis, the sensitizing reagent being of solution containing yellow filter dye and a colloidal red sensitizer, heretofore specified, the resulting sensitized plate being the red-blue plate previously described.

In this plate the red-orange and warm yellows will register on the stratum of the emulsion distant from the glass while the blue-green and cold yellow will register on the stratum adjacent the glass of the plate.

The plate is treated by exposure, development, and then being subjected to a stopbath of acetic acid containing chrome alum, after which the images or impressions of the respective warm color and cold color aspects red and blue respectively are printed separately by reversing the plate in a reflection printer, each color aspect being printed on a separate plate.

After printing to provide color separation, the plate is fixed and printed by transmitted light to form a black and white key plate.

The respective color separation plates and key plate, three in number, are then treated in a manner well known in the graphic arts and color photographic industry for the production of respective color printing plates.

Although in the illustration involving three color separation with a black and white key plate, the stratified plate is treated so as to provide the recording of the red and blue color aspects, while the other plate of the bi-pack is sensitized to the color green, the operation need not be limited to such procedure; a blue sensitive plate may be used as raw stock and the same may be sensitized to a portion of its depth for the color green, and such stratified plate sensitized to green and blue may be bi-packed with a red sensitive plate.

Further, with respect to emulsions in which the green or the red sensitivity is many times the native blue sensitivity thereof, such emulsions being considered essentially green or red sensitive; either of such emulsions thereafter can be sensitized to respectively the color red or green, thereby producing a stratified emulsion sensitive to both the red and the green. In the event that the presensitized emulsion is, for example, green sensitive, the same may be treated with a solution containing a minus green filter dye, and a red sensitizer, such as pinacyanol. In the event that the presensitized emulsion is red sensitive, then a minus red filter dye and a green sensitizer, such as pinaverdol, is applied to provide the stratified emulsion.

By the word "carrier" is meant, generally a transparent material upon which is disposed emulsion, as, for example, individual glass plates or a continuous length of transparent celluloid or other material forming a film.

The expressions "sensitive to or sensitized for a color", as, for example, the color red or the red color aspect, are herein interchangeably used with the more technical expressions "sensitized for or sensitive to one region or a specific region of the spectrum."

Further, although it has been specified that the blue sensitized emulsion or stratum of the emulsion is disposed adjacent the aperture of the camera when the exposure is taken, the order of the sensitized plates may be changed in the event that the emulsion of each carrier is sensitized throughout its depth for one color.

It is obvious that various changes and modifications may be made to the details of construction without departing from the general spirit of the invention as set forth in the appended claims.

I claim:

1. In a method of producing color separation images for photo mechanical work, the steps of exposing a sensitized photographic element consisting of a carrier having a stratified emulsion, one stratum of which is predominantly sensitive to one region of the spectrum and the other stratum of which is predominantly sensitive to another region of the spectrum, developing the images, subjecting the emulsion to a stopbath, and thereafter printing by reflection the color record images of the respective strata to produce two color separation prints, thereafter fixing the emulsion and printing the images thereof by transmitted light to produce a print suitable for use as a black and white or key image.

2. In a method of producing color separation images for photo mechanical work, the steps of exposing a sensitized photographic element consisting of a carrier having a stratified emulsion, one stratum of which is predominantly sensitive to the warmer region of the spectrum and the other stratum of which is predominantly sensitive to the colder region of the spectrum, developing the images, subjecting the emulsion to a stopbath and thereafter printing by reflection the color record images of the respective strata to produce two color separation prints, thereafter fixing the emulsion and printing the images thereof by transmitted light to produce a print suitable for use as a black and white or key image.

3. In a method of producing color separation images for photo mechanical work, the steps of exposing a bi-pack consisting of an element having a stratified emulsion, one stratum of which is predominantly sensitive to one region of the spectrum, and the other stratum of which is predominantly sensitive to another region of the spectrum, and another element having an emulsion predominantly sensitive to a third region of the spectrum, developing the images, subjecting the emulsions to a stopbath, and thereafter printing by reflection the color record images of the respective strata in the plural strata element and that in the single stratum element to produce three color separation prints, fixing the plural strata emulsion and printing the images thereof by transmitted light to produce a print suitable for use as a black and white or key image.

4. In a method of producing color separation images for photo mechanical work, the steps of exposing a bi-pack consisting of an element having a stratified emulsion, one stratum of which is predominantly sensitive to the warmer region of the spectrum, and the other stratum of which is predominantly sensitive to a colder region of the spectrum, and another element having an emulsion predominantly sensitive to another colder region of the spectrum, developing the images, subjecting the emulsions to a stopbath, and thereafter printing by reflection the color record images of the respective strata in the plural strata element and that in the single stratum element to produce three color separation prints, fixing the plural strata emulsion and printing the images thereof by transmitted light to produce a print suitable for use as a black and white or key image.

5. In a method of producing color separation images for photo mechanical work, the steps of exposing a bi-pack consisting of an element having a stratified emulsion, one stratum of which is predominantly sensitive to the red region of the spectrum and the other stratum of which is predominantly sensitive to the blue region of the spectrum, and another element having an emulsion predominantly sensitive to a green region of the spectrum, developing the images, subjecting the emulsions to a stopbath, and thereafter printing by reflection the color record images of the respective strata in the plural element and that in the single stratum element to produce three color separation prints, fixing the plural strata emulsion, and printing the images thereof by transmitted light to produce a print suitable for use as a black and white or key image.

JOSEPH S. FRIEDMAN.